(12) United States Patent
Matsuda et al.

(10) Patent No.: US 7,502,506 B2
(45) Date of Patent: Mar. 10, 2009

(54) IMAGE PROCESSING DEVICE AND METHOD FOR THE SAME

(75) Inventors: Yoichi Matsuda, Saitama (JP); Shigeki Yamashita, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 659 days.

(21) Appl. No.: 11/313,924

(22) Filed: Dec. 22, 2005

(65) Prior Publication Data

US 2007/0002075 A1  Jan. 4, 2007

(30) Foreign Application Priority Data

Jul. 4, 2005    (JP)    ............................. 2005-194920

(51) Int. Cl.
*G06K 9/00* (2006.01)
(52) U.S. Cl. .................................... 382/167
(58) Field of Classification Search ................ 382/162, 382/167, 172, 274, 275; 358/463, 464
See application file for complete search history.

(56) References Cited

U.S. PATENT DOCUMENTS 5,850,298 A * 12/1998 Narahara et al. ............ 358/518

6,944,353 B2 * 9/2005 Matsuda ..................... 382/274

FOREIGN PATENT DOCUMENTS

JP     2002-247363 A    8/2002

\* cited by examiner

*Primary Examiner*—Phuoc Tran
(74) *Attorney, Agent, or Firm*—Sughrue Mion, PLLC

(57) ABSTRACT

An image processing device which includes: an image data inputting unit that inputs image data; a converting unit that converts image data inputted by the image data inputting unit into data of channels in a predetermined color space; a ground detecting unit that detects respective ground levels from the data of each of the channels converted by the converting unit; a calculating unit that calculates a ground removing level for each of the channel, based on the ground level of each of the channels detected by the ground detecting unit; a ground removing unit that performs a ground removing process for each of the channels, based on the ground removing level of each of the channels calculated by the calculating unit; and a creating unit that creates image data in which the ground is removed, based on the data for each of the channels for which the ground removing process is performed by the ground removing unit.

6 Claims, 11 Drawing Sheets

IMAGE PROCESSING DEVICE AND METHOD FOR THE SAME

BACKGROUND OF THE INVENTION

1. Field of the Invention

The present invention relates to an image processing device and method for the same, and more particularly relates to an image processing device and method for the same that are capable of detecting a ground in color image data and eliminating this ground effectively.

2. Description of the Related Art

In recent years, along with the increasing popularity of digital cameras, cases are being seen in which information written upon a blackboard or whiteboard, or part of the information in a notice, advertising leaflet, magazine, or newspaper is being photographed with a digital camera, and the information is being recorded in this manner.

It is considered that the reason for this is that, with the enhancement of the performance of digital cameras, their resolution has increased, and moreover they are easily portable to an event location, so that it has become possible to photograph a photographic subject and to record the resulting information in an easy and simple manner.

In the past, when recording the information in a printed document such as an advertising leaflet or a magazine, a semi-fixed type scanner has been used, and in this case a uniform lighting (illumination) state is obtained.

However, when recording information with a digital camera, it is difficult always to obtain a uniform lighting state during photography, and unevenness is typically present in an image that has been photographed under such non-uniform lighting conditions, which is not desirable.

Furthermore, when photographing a paper manuscript or the like with a digital camera, the ground of the paper may also be photographed in the image data, so that it appears soiled, which is also not desirable.

When unevenness or blotchiness is present in color image data which has been photographed, it is difficult to eliminate such a ground in the image data, even by performing color copying or color scanning or the like.

As a related art technique for removing a ground in image data which has been photographed, an image processing device has been proposed, as disclosed in Japanese Patent Laid-Open Publication 2002-247363, which is capable of detecting the ground level for each area of a manuscript and of performing natural ground removing process, even in the case of a manuscript which exhibits blotchiness, such as when the ground level changes abruptly, as may happen with the ground of the image data for a manuscript which is pasted together or the like, or when the ground level continually varies.

It should be understood that, with the technique described in the above Japanese Patent Application Laid-Open No. 2002-247363, a method is proposed, as ground removing process for a manuscript which is pasted together, of changing abruptly the ground level which is detected; and further a method is proposed, as ground removing process for a manuscript which exhibits blotchiness, of performing adjustment so that the ground level varies gradually in a continuous fashion.

However, with the technique described in the above Japanese Patent Application Laid-Open No. 2002-247363, since the process is performed while only paying attention to the density value of the image data of the manuscript, correspondence has no longer been maintained of the individual pixels with the color image data expressed by the values of the channels of the color space.

Thus, for example, in the case of color image data which is expressed by an RGB color space, when the invention described in the above Japanese Patent Application Laid-Open No. 2002-247363 is applied to each of the respective channels R, G, and B, the color matching changes, and inconveniences such as color oozing and the like arise.

SUMMARY OF THE INVENTION

Thus, the present invention has been made in view of the above circumstances and provides an image processing device and method for the same, which, even when the image data of a manuscript is in color, can detect a ground in this color image data, and can remove this ground in an effective manner.

An aspect of the present invention provides an image processing device which includes; an image data inputting unit that inputs image data; a converting unit that converts image data inputted by the image data inputting unit into data of channels in a predetermined color space; a ground detecting unit that detects respective ground levels from the data of each of the channels converted by the converting unit; a calculating unit that calculates a ground removing level for each of the channel, based on the ground level of each of the channels detected by the ground detecting unit; a ground removing unit that performs a ground removing process for each of the channels, based on the ground removing level of each of the channels calculated by the calculating unit; and a creating unit that creates image data in which the ground is removed, based on the data for each of the channels for which the ground removing process is performed by the ground removing unit,

BRIEF DESCRIPTION OF THE DRAWINGS

Embodiments of the present invention will be described in detail based on the following figures, wherein.

DETAILED DESCRIPTION OF THE INVENTION

In the following, embodiments of the image processing device and method according to the invention will be explained in detail with reference to the appended drawings.

Figure 1:
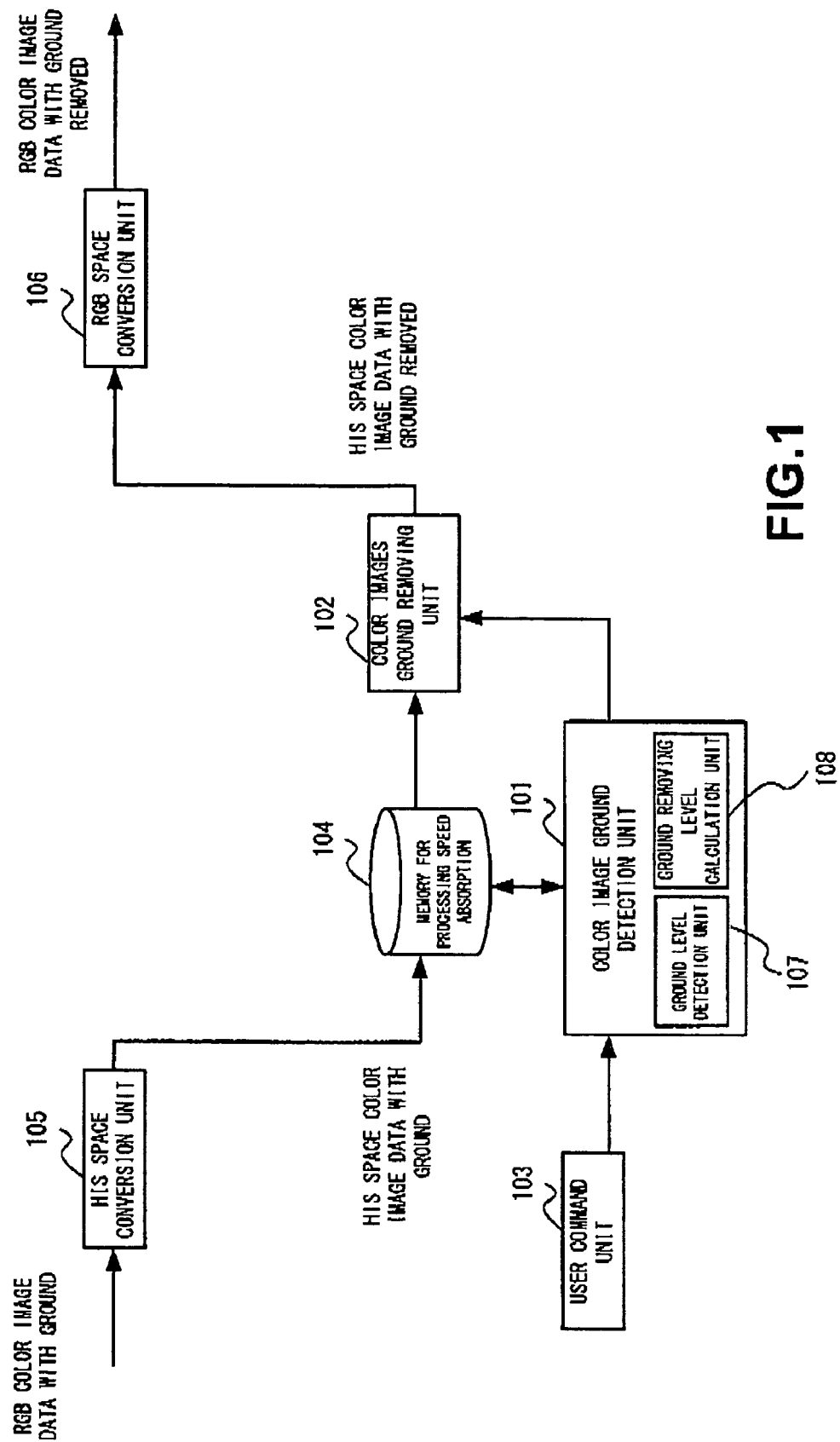
FIG. 1 is a block diagram showing the structure of an image process device according to the present invention.

FIG. 1 is a block diagram showing the structure of an image processing device according to the invention The image processing device according to the invention comprises a color image ground detection unit 101, a color images ground removing unit 102, a user command unit 103, a memory for processing speed absorption 104, a HIS space conversion unit 105, and a RGB space conversion unit 106 for a personal computer.

The color image ground detection unit 101 comprises a ground level detection unit 107 and a ground removing level calculation unit 108.

The ground level detection unit 107 divides color image data expressed as a HIS (Hue-Intensity-Saturation) space inputted to the memory for processing speed absorption 104 into a plurality of areas where the number of the divided areas is arbitrary, and constructs histograms according to the values for each channel H (hue), I (intensity), and S (saturation) of the HIS space pixels which are present within each of these divided areas.

From the histograms which have thus been constructed, a threshold value is determined for each of the channels H, I, and S as a ground level, and furthermore, a range value which indicates the range of ground is determined as a ground level for that channel for which the ground removing priority order as inputted by the user command unit 103 is the first ranking.

By constructing these histograms in this manner, threshold values and range values are determined as ground levels.

For the threshold values, although the histograms which are constructed are made for each of H, I, and S, and the threshold values are determined by the maximum frequency values, as an alternative, a method is also possible of performing this determination by analyzing the constructed histograms, or a method of calculating the respective average value or intermediate value for each of the H, I, and S channels within an area, and determining the calculated values as the threshold values.

For the range values, these are the widths from the threshold values: a ground removing standard requested by the user via the user command unit 103 is sent to the color image ground detection unit 101, and they are determined from a data array set in advance in the ground level detection unit 107 according to this ground removing standard which has been sent to it.

And the ground level which has been detected is corresponded by the ground removing level calculation unit 108 within the color image ground detection unit 101 to the case of a manuscript for which the input color image data is blotchy, or the case of a manuscript which is pasted together, and the ground level is adjusted and a ground removing level is calculated.

If it is determined that this is a manuscript for which the input color image data is blotchy, then a method is executed of performing adjustment so that the ground level for each channel of the divided area varies gradually and continuously, while, in the case of a manuscript which is pasted together, adjustment is performed by a method in which the ground level for each channel of the divided area changes abruptly, and a ground removing level is calculated for each channel in the divided area by the ground removing level calculation unit 108.

The color images ground removing unit 102 performs ground removing process of the color image data which is stored in the memory for processing speed absorption 104, based upon the ground removing levels which have been sent from the color image ground detection unit 101.

After the information of the ground removing levels which is sent to the color images ground removing unit 102 have been calculated by the ground removing level calculation unit 108, the threshold value for each channel, which is its ground removing level, the range value for that channel for which the priority ranking is first, and the priority order for the channel for which ground removing is to be performed as a priority, are sent from the color image ground detection unit 101.

The color image data for which ground removing is performed by the color images ground removing unit 102 is sent from the memory for processing speed absorption 104 to the color images ground removing unit 102.

The user command unit 103 is an input device upon which the user inputs a ground removing standard as being strong, medium, or weak, as a ground removing standard from strong to weak for performing ground removing; or, according to circumstances, the user may input a range value directly, or he may perform input of a selection which determines a range value indicating the ground level automatically.

Furthermore, when performing ground removing process, a priority order for the H, I, and S channels which specifies the priority for performing ground removing is inputted by the user from the user command unit 103.

When color image data expressed as an HIS color space for ground removing process to be performed is inputted, and a threshold value and a range value for this expressed color image data are detected in the color image ground detection unit 101, the memory for processing speed absorption 104 stores the color image data which is to be the subject for ground removal within this memory for processing speed absorption 104 in order to enhance the processing speed.

When color image data which is to be the subject of ground removal is expressed as an RGB (Red-Green-Blue) color space, the HIS space conversion unit 105 performs conversion processing of the color space from RGB to HIS, so as to express this color image data which is expressed as an RGB color space, as an HIS color space.

The color image data which has been converted by this HIS space conversion unit 105 is expressed as an HIS color space, and is sent to the memory for processing speed absorption 104 with the values for each channel of H, I, and S all extending from 0 to 255.

The RGB space conversion unit 106 performs processing for converting color image data which is expressed as an HIS color space in which the ground has been eliminated by the color images ground removing unit 102, so as to express it as an RGB color space.

In this manner, in the image processing device according to the invention, color image data which has been expressed in an RGB color space is inputted to the HIS space conversion unit 105, and the color space of this inputted color image data is converted from RGB to HIS by the HIS space conversion unit 105, and it is then stored in the memory for processing speed absorption 104.

And a ground removing level is calculated within the color image ground detection unit 101 according to the information such as a ground removing standard and the like which has been inputted via the user command unit 103, the ground removing process of the inputted color image data is performed by the color images ground removing unit 102, it is converted from an HIS space to an RGB space by the RGB space conversion unit 106, and thereby color image data in RGB space which has been processed for ground removing is created.

Next, the color image data is divided into a plurality of areas where the number of the divided areas is arbitrary; the case of M×N (vertical×horizontal) pixels present in one of these areas that have thus been divided up will be explained with reference to FIG. 2.

Figure 2:
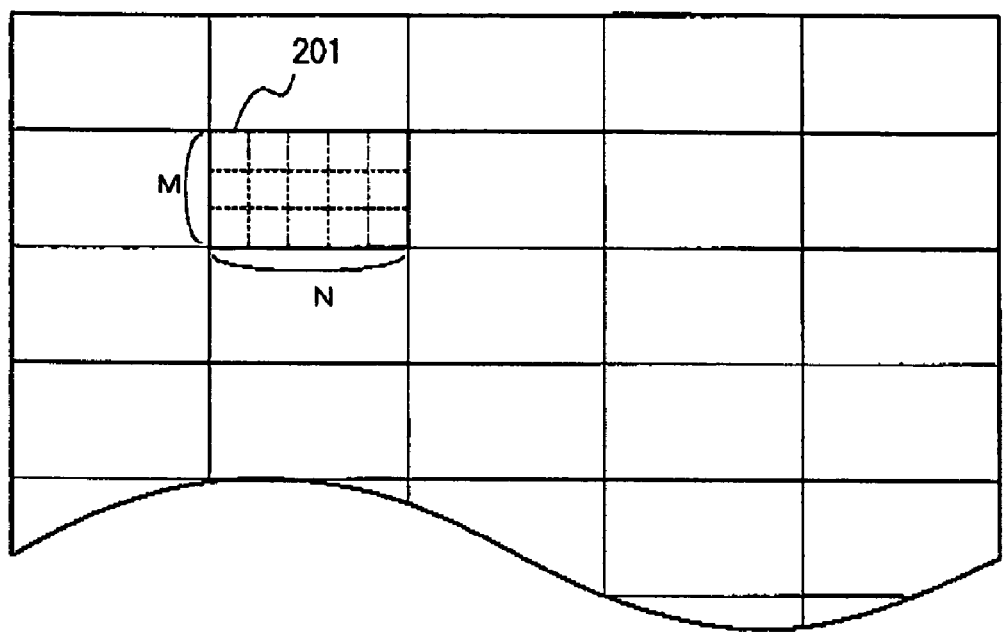
FIG. 2 is a schematic figure showing M×N pixels present within one of a plurality of areas into which color image data has been divided.

FIG. 2 is a schematic figure showing M×N pixels present within one of a plurality of areas into which a color image data has been divided.

As shown in FIG. 2, the color image data is divided into a plurality of areas, the number of the divided areas is arbitrary, and M×N pixels are present within an area 201, which is one of these areas.

A histogram is constructed by the ground level detection unit 107 within the color image ground detection unit 101 for the values of each of the channels H, I, and S of the M×N pixels which are present in this one area, and threshold values and range values, which are ground levels, are obtained.

Next, these histograms which are constructed according to the values of each of the channels H, I, and S of the M×N pixels which are present in this one of the areas into which the color image data stored in the memory for processing speed absorption 104 is divided will be explained with reference to FIGS. 3A through FIG. 3C.

Figure 3A:
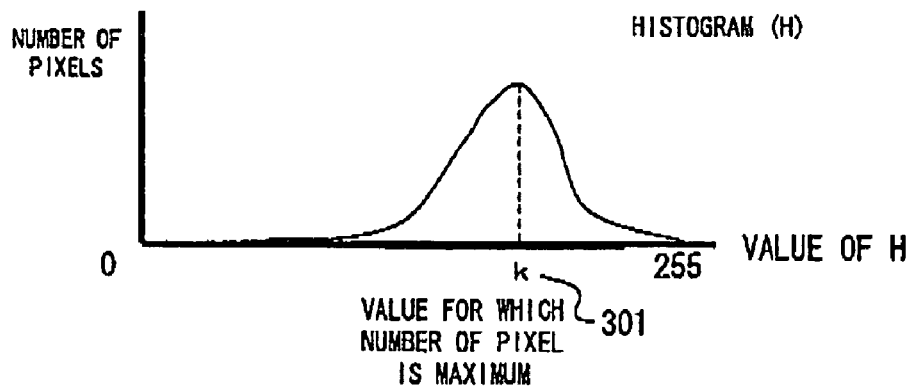
FIGS. 3A to 3C are histograms constructed according to the values of each of channels H, I, and S for the M×N pixels present within one among a plurality of areas into which color image data stored in a memory for process speed absorption 104 has been divided.
Figure 3B:
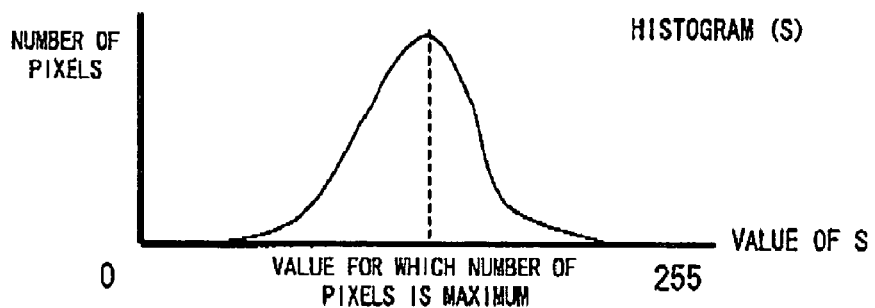
Figure 3C:
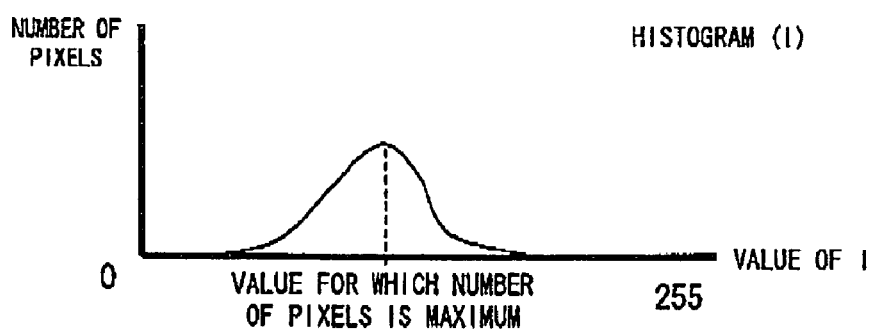

FIGS. 3A through 3C are histograms which are constructed according to the values of each of the channels H, I, and S of the M×N pixels which are present in this one of the areas into which the color image data stored in the memory for processing speed absorption 104 is divided.

FIG. 3A is a histogram which is constructed with the values of the H channel of the M×N pixels which are present in this one of the areas into which the color image data stored in the memory for processing speed absorption 104 is divided; FIG. 3B is a histogram which is constructed with the values of the S channel of the M×N pixels which are present in this one of the areas into which the color image data stored in the memory for processing speed absorption 104 is divided; and FIG. 3C is a histogram which is constructed with the values of the I channel of the M×N pixels which are present in this one of the areas into which the color image data stored in the memory for processing speed absorption 104 is divided.

M×N pixels are present in this one among the areas into which the color image data stored in the memory for processing speed absorption 104 is divided, as has been explained with reference to FIG. 2, and a histogram is constructed for each of H, I, and S according to the values upon each of the channels H, I, and S of the pixels of these M×N pixels.

A histogram for each of H, I, and S for this one area is constructed by the color image ground detection unit 101, and, from each of these histograms which have been constructed, there are obtained the threshold value and the range value which indicate the ground level, and which are required in order to remove the ground in the color image data.

As shown in FIG. 3A to 3C, a histogram is constructed for each of the H, I, and S channels of the pixels in this one area, and the ground level detection unit 107 determines, as the threshold values, the values of H, I, and S used at high frequency for the pixels within the area, which are the values which constitute the peaks of the histograms which have been constructed.

For example, in the histogram for H shown in FIG. 3A, the value of H which constitutes a peak in the histogram is k (301), and, since this is the value for which the frequency with which it is used within the area over which the histogram has been constructed is the first, accordingly the threshold value for H becomes k (301).

The threshold values for S and I, which are the other channels, are obtained in the same manner: from the histogram for S shown in FIG. 3B, and from the histogram for I shown in FIG. 3C, the values of S and I which are used with the most frequently are obtained as the threshold values for the respective channels.

Next another method for determining the threshold values related to H, I, and S for this one of the areas among the areas into which the color image data has been divided by the color image ground detection unit 101 will be explained with reference to FIG. 4.

Figure 4:
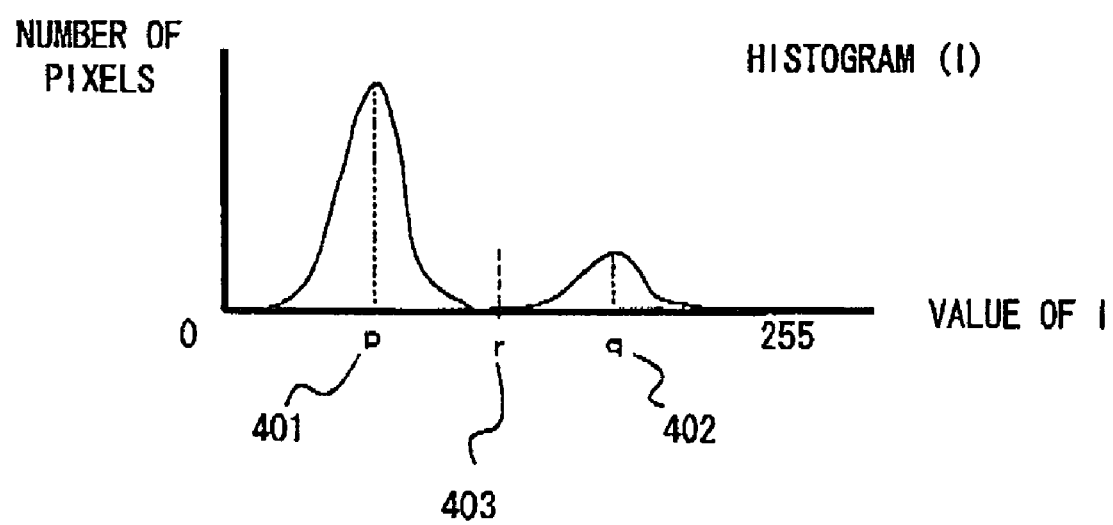
FIG. 4 is a histogram showing a method for determining the threshold value for each of the channels H, I, and S by performing analysis upon histograms which have been constructed, which is one method for determining the threshold values for the various channels for one among the plurality of areas into which the color image data has been divided by a color image ground detection unit 101.

FIG. 4 is a histogram showing a method for determining the threshold value for each of the channels H, I, and S by performing analysis upon the histograms which have been constructed, which is one method for determining the threshold values for each of the channels for one of the areas into which the color image data has been divided by the color image ground detection unit 101.

As this method for determining the threshold value for each of the channels H, I, and S in one area among the areas into which the color image data has been divided, although the method has been explained of constructing histograms for each of H, I, and S and setting the maximum frequency values as threshold values, apart from this, it would also be possible to determine the threshold values by analyzing the histograms which have been constructed with some different analysis technique.

For example, as such a different analysis technique, in the case that the situation has occurred that, as shown in FIG. 4, two peaks have been constructed in the histogram for one of the channels in the area, it is also possible to employ an analysis technique in which r (403), which is a value intermediate between the value p (401) which denotes the first peak and the value q (402) which denotes the other peak is set as the threshold value.

In this manner, it is possible to determine the threshold values by analyzing the histograms by some method other than the method of constructing histograms for each of the channels H, I, and S for the pixels in the area, and setting the maximum frequency values as the threshold values.

Next, the range value that denotes the range in the color space of the ground level detected by the ground level detection unit 107 in the color image ground detection unit 101 will be explained with reference to FIG. 5.

Figure 5:
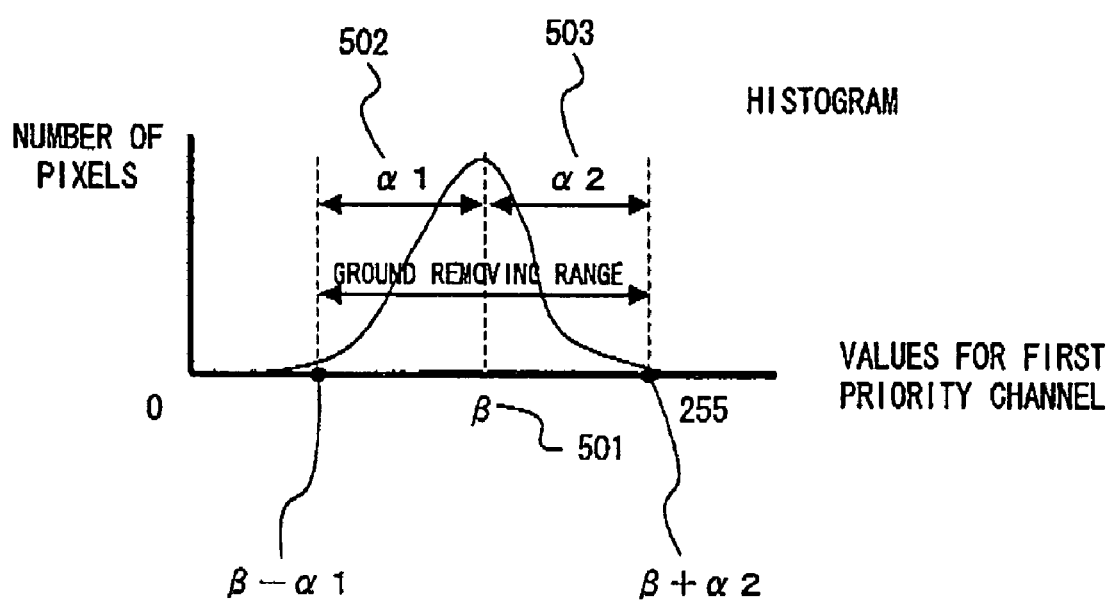
FIG. 5 is a histogram showing range values, which shows a range of a ground level, in a color space, detected by a ground level detection unit 107 in the color image ground detection unit 101.

FIG. 5 is a histogram showing range values, which shows the range in the color space of the ground level detected by the ground level detection unit 107 in the color image ground detection unit 101.

As shown in FIG. 5, a threshold value □ (501) is obtained by setting, as the threshold value, the value for which the frequency is maximum in the histogram for that channel of the H, I, and S channels which is in the first priority order for ground removing, as inputted via the user command unit 103.

And, taking the threshold value □ (501) as a center, the values −□1 (502) and +□2 (503) which will be explained hereinafter are taken as range values which denote the range in the color space of ground level which is to become the subject of ground removing process, so that a range from □−□1 to □+□2 becomes the ground removing range for which ground removing process is performed.

Next, the method by which are obtained the values of □1 (502) and □2 (503), which are to become the range values that indicate the ground level to be subjected to ground removing process, will be explained with reference to FIG. 6.

Figure 6:
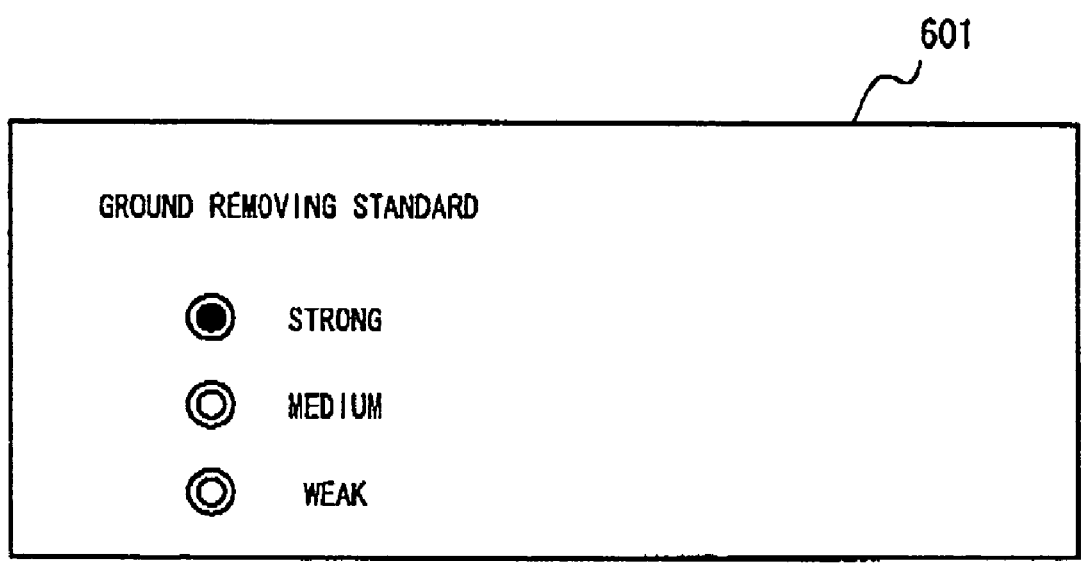
FIG. 6 is a schematic screen figure showing a user interface screen 601, which is an example of a user interface screen appertaining to a user command unit 103, upon which the user inputs a ground removing standard from strong to weak.

FIG. 6 is a schematic screen figure showing a user interface screen 601, which is an example of a user interface screen appertaining to the user command unit 103, upon which the user inputs a ground removing standard from strong to weak.

As shown in FIG. 6, the strength of the level for removing a ground in the color image data is selected, via the user interface screen 601, between strong, medium, and weak by the user who is performing ground removing process for the color image data.

When the ground removing standard is selected by the user, the level which has been selected is sent from the user command unit 103 to the ground level detection unit 107 in the color image ground detection unit 101, and the values of □1 (502) and □2 (503) which are to become the range values denoting the ground level for performing ground removing process are determined from a data array which is set in advance in the color image ground detection unit 101.

In other words, if the ground removing standard "strong" has been selected, then, by setting the values of □1 (502) and □2 (503), which are to become the range values for the ground level for ground removing process to be performed, to be large, the range of ground for ground removing process to be performed becomes wide, so that ground within a wide range comes to be removed.

As another method for determining the values of □1 (502) and □2 (503) that are to become the range values denoting the ground level for performing ground removing process, the values of □1 (502) and □2 (503) may be directly inputted from the user command unit 103.

If the values of □1 (502) and □2 (503) are thus directly inputted from the user command unit 103, then this input of the values of □1 (502) and □2 (503) is performed by the user via a user interface screen not shown in the figures.

Furthermore, as yet another method for determining the values of □1 (502) and □2 (503) which are to become the range values denoting the ground level for performing ground removing process, it would also be possible to employ a method of determining a □1 (502) and □2 (503), which are the range values, by detecting bases of a peak in the histogram which has been constructed automatically by the color image ground detection unit 101, and by setting, as the range which denotes the ground level, from one base of the peak across the summit of the peak to the other base.

A method of obtaining □1 (502) and □2 (503) which are to become the range values denoting the ground level for performing ground removing process by automatic detection from the bases of a peak in the histogram, would be for the fact that □1 (502) and □2 (503) are to be automatically obtained to be selected by the user with the user command unit 103, via a user interface screen not shown in the figures.

It should be understood that, for the range values which denote the ground removing range over which ground removing process is to be performed, it would also be acceptable, not to obtain □1 (502) and □2 (503) as the width from the threshold value, but rather to set the range in the color space as the range values.

In other words although, in the above described example, □1 (502) and □2 (503) were taken as the range values, it would also be acceptable to take □−□1 and □+□2 as the range values which denote the range, so that the range which denotes the ground is set as being from □−□1 to □+□2.

Next, the ground removing process that is performed with the color images ground removing unit 102 will be explained.

After having detected the ground level with the ground level detection unit 107 in the color image ground detection unit 101, even if the color image data which has been inputted and upon which ground removing is to be performed is a manuscript which is pasted together or a manuscript which is blotchy, so as to be able to perform natural ground removing process, the ground level which has been detected is adjusted and a ground removing level is calculated by the ground removing level calculation unit 108, and the threshold values of each of the channels H, I, and S for which a ground removing level has been calculated, a priority order indicating the priority at which ground removing for the channels H, I, and S is to be performed, and the values for the range from the threshold value, which is the ground removing level, are sent from the color image ground detection unit 101 to the color images ground removing unit 102.

The color images ground removing unit 102 performs ground removing process based on the numerical values for the color image data stored in the memory for processing speed absorption 104 which have been received from the color image ground detection unit 101.

Here, attention will be focused upon a single pixel for which ground removing process is to be performed among the M×N pixels which are present within one of the areas into which the color image data upon which ground removing process is to be performed has been divided; and an explanation will be provided for the ground removing process which is performed for that pixel, while taking the HIS values for that pixel as being Hn, In, and Sn This ground removing process for the color image data stored in the memory for processing speed absorption 104 is performed for all of the M×N pixels that are present within the divided up area, and thereby ground removing process within the area is performed.

And the ground removing process for the color image data stored in the memory for processing speed absorption 104 is performed by performing this ground removing process which has been performed for a single area, for all of the areas.

The explanation will be given in terms of the information which has been sent by the color image ground detection unit 101 to the color images ground removing unit 102 being: the order of H, I, and S, which is the priority order of the channels as inputted via the user command unit 103; the threshold values which are the ground removing levels for each of H, I, and S within the area upon which ground removing process is to be performed, respectively denoted as H_Histmax, I_histmax, and S_histmax; and the range value, which is the ground removing level which is the range specifying the ground upon which ground removing process is to be performed for the first H in the priority order, and which is from H_□1 to H_□2.

It should be understood that, since H is the hue, since the actual values are supposed to have the structure of a ring like 0, 1, 2, ... 254, 255, 0, 1, ..., accordingly, when H_□1 is 254 and H_□2 is 10, the range which specifies the ground upon which ground removing process is to be performed is 254, 255, 0, 1, ... 9, 10.

The flow of processing for the ground removing process that is performed for one pixel within the area upon which ground removing process is to be performed will now be explained with reference to FIG. 7.

Figure 7:
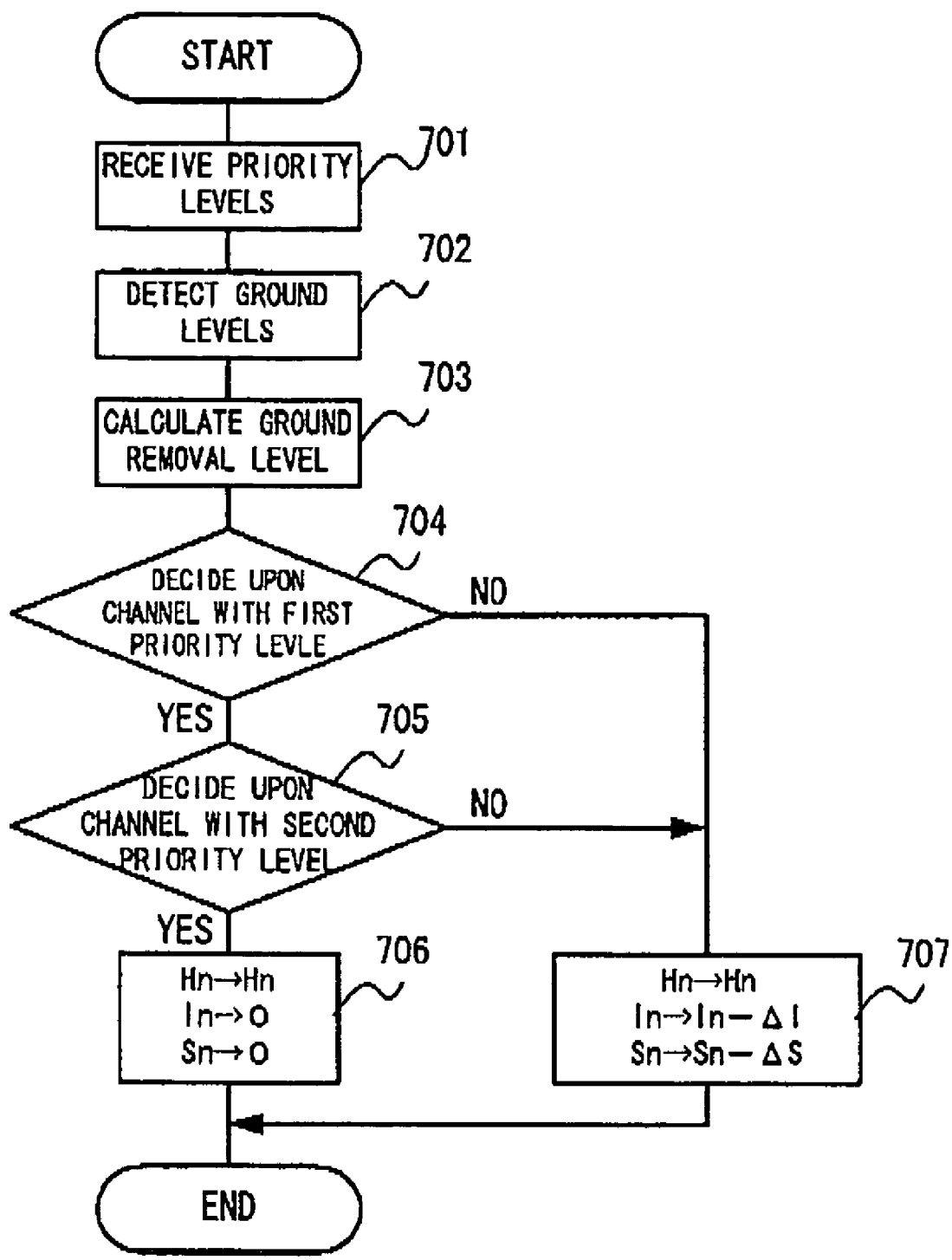
FIG. 7 is a flow chart showing the processing flow for the ground removing process that is performed for one pixel within an area upon which ground removing process is being performed.

FIG. 7 is a flow chart showing the flow of processing for the ground removing process that is performed for one pixel within the area for which ground removing process is to be performed.

First, the order of H, I, and S, which is the priority order for the channels for which the ground removing is to be performed, is received from the user command unit 103 (in a step 701).

Next, the color image data specified by a HIS space which has been inputted to the memory for processing speed absorption 104 by the ground level detection unit 107 within the color image ground detection unit 101 is divided into a plurality of areas as explained with reference to FIG. 2, and histograms are constructed with the values for each of the channels H, I, and S of the pixels which are present in one of the areas which have thus been produced by division, and the threshold values, which are ground levels for each of the channels H, I, and S, and the range values, which are ground levels, are determined (in a step 702); and moreover (in a step 703), the ground removing levels are calculated by the ground removing level calculation unit 108 in the color image ground detection unit 101 as H_Histmax, I_histmax, and S_histmax in the threshold values for each channel; and the range which specifies ground for the channel for which the priority order received from the user command unit 103 is the first is calculated as being from H_□1 to H_□2.

And since the pixel values for one pixel within the area divided up by the color images ground removing unit 102 are Hn, In, and Sn, and since the priority order is the order H-I-S, accordingly a decision is made (in a step 704) that the channel H is that channel which is the first one in the priority order; following on from the result of this decision for H in the step 704, a decision is made (in a step 705) that the I channel is the second one in the priority order; and, following on from the results of these decisions in the steps 704 and 705, the values with which ground removing process is to be performed for the channels H, I, and S are determined (in a step 706 or a step 707).

It should be understood that the decision for the channel which is the first one in the priority order, performed in the step 704, is performed according to whether or not the pixel value of the pixel for which ground removing process is being performed is included within the range which specifies ground.

In other words, for H that is the first channel in the priority order, it is decided whether or not Hn, which is the pixel value, satisfies H_□1<Hn<H_□2.

Furthermore, the decision for the channel which is the second one in the priority order, performed in the step 705, is performed according to whether or not the pixel value of the pixel for which ground removing process is being performed is less than or equal to the threshold value, which is the ground level.

In other words, for I which is the second channel in the priority order, a decision is made as to whether or not In, which is the pixel value, satisfies In<I_histmax.

If the result of the decision for the channel which is the first one in the priority order is YES, in other words if Hn, which is the value of H (the hue), satisfies H_□1<Hn<H_□2 (YES in the step 704), then it is decided that there is a possibility that the pixel which is being processed is ground, so that the flow of control proceeds to the step 705, and next, in this step 705, a decision is performed for I (intensity), which is the second channel in the priority order, and it is decided whether or not In, which is the value of I, satisfies In<I_histmax.

If the result of the decision for the channel which is the second one in the priority order is YES, in other words if In, which is the value of I, satisfies In<I_histmax (YES in the step 705), then it is decided that the pixel which is being processed is ground, so that the values of Hn, In, and Sn, which are the pixel values, are determined (in the step 706) so that, while the value of Hn which specifies the hue is not changed, the value of I is set to 0, which is the value for which the color is the brightest, while the value of S is set to 0, which is the value for which the color is the least brilliant and is the closest to gray.

With regard to the intensity, it should be understood that although, in this embodiment, a color space has been assumed in which the intensity is expressed so that the range of its values in the color space is from 0 to 255, and the closer is the value of the intensity to 0 the brighter does the brightness of the color become and the closer it is to white, while the closer is the value of the intensity to 255 the darker does the brightness of the color become and the closer it is to black, in the case of a different color space, which is one in which the intensity is expressed so that the closer is the value of the intensity to 255 the brighter does the brightness of the color become and the closer it is to white, while the closer is the value of the intensity to 0 the darker does the brightness of the color become and the closer it is to black, as far as the value of I which is determined by the step 706 is concerned, for a bright color, an intensity I is determined which is not 0 but 255.

Furthermore if, in the step 704, the result of the decision for the channel which is the first one in the priority order is NO, in other words if Hn, which is the value of H (hue), does not satisfy H_□1<Hn<H_□2 (NO in the step 704), or I, in the step 705, the result of the decision for the channel which is the second one in the priority order is NO, in other words if In, which is the value of I (the intensity), does not satisfy In<I_histmax (NO in the step 705), then the values for each channel with the ground removed are determined by setting, as the value for H, the unchanged value Hn, and by setting, for I and S, values obtained by using a LUT (Look Up Table) (in the step 707).

Next, a method of determining the values of I and S in the step 707 with a LUT, in the case of a NO decision in the step 704 or a NO decision in the step 705, will be explained with reference to FIGS. 8A and 8B.

Figure 8A:
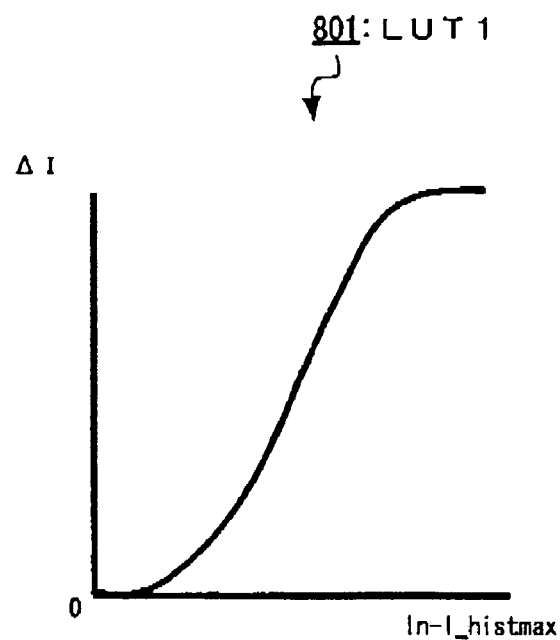
FIGS. 8A and 8B are graphs showing a LUT which is used when, in the flow chart shown in FIG. 7, determining the values of I and S in a step 707 with a LUT, in the case of a NO decision in a step 704 or a NO decision in a step 705.
Figure 8B:
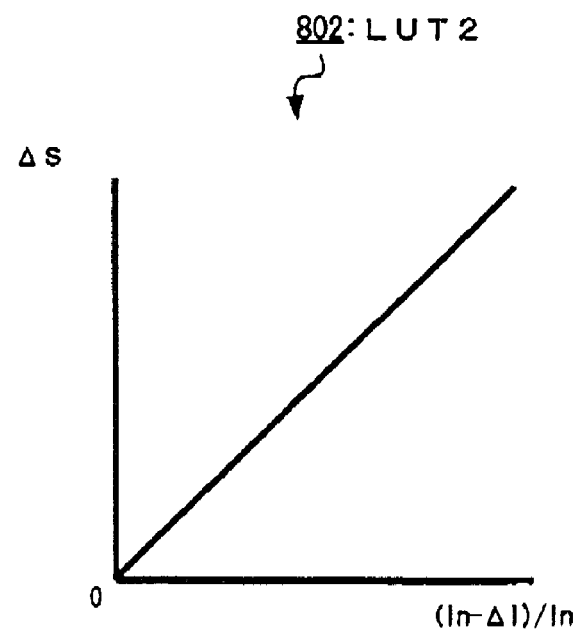

FIGS. 8A and 8B are graphs showing a LUT which is used when, in the case of a NO decision in the step 704 or a NO decision in the step 705, determining the values of I and S with a LUT in the step 707 of the flow chart shown in FIG. 7.

FIG. 8A is a graph showing a LUT1 (801) which is used when the value of I is being determined if, in the flow chart shown in FIG. 7, a NO decision has been taken in the step 704 or a NO decision has been taken in the step 705; while FIG. 8B is a graph showing a LUT2 (802) which is used when the value of S is being determined if, in the flow chart shown in FIG. 7, a NO decision has been taken in the step 704 or a NO decision has been taken in the step 705.

The LUT1 (801) and the LUT2 (802) are graphs which output a value corresponding to an input value, and, in this LUT1 (801) and LUT2 (802), the values which are outputted in correspondence to the values which are inputted may change according to any desired conversion table or function.

With regard to the value for the channel I, first, the value of In–I_histmax is obtained, and then this value which has been obtained is inputted into the LUT1 (801) shown in FIG. 8A, and a value □I is obtained.

Next, by obtaining the value In–□I, a value is obtained for the channel I for which ground removing process has been performed, and the value for the channel I for which ground removing process has been performed becomes In–□I.

With regard to the value for the channel S, first, the value of (In–□I)/In is obtained, and then this value which has been obtained is inputted into the LUT2 (802) shown in FIG. 8B, and a value □S is obtained.

And, by obtaining the value Sn–□S, a value is obtained for the channel S for which ground removing process has been performed, and the value for the channel S for which ground removing process has been performed becomes Sn–□S, By doing this, values of H, I, and S after ground removing process has been performed are obtained for one of the pixels within a single area which has been divided, and, by performing ground removing process in the same manner for the other pixels within the same area, values of H, I, and S are obtained for those other pixels, so that, finally, ground removing process is performed for all of the pixels within that area.

And, by performing ground removing process in the same manner for all of the areas that have been divided up, for all of the pixels in the color image data that has been inputted, values for each of the channels H, I, and S are obtained upon which ground removing process has been performed.

When values for each of the channels H, I, and S upon which ground removing process has been performed by the color images ground removing unit 102 have been obtained for the color image data stored in the memory for processing speed absorption 104, so that color image data is obtained upon which ground removing process has been performed and which is expressed as a HIS space, then this color image data which is expressed as a HIS space is converted by the RGB space conversion unit 106, so as to obtain color image data upon which ground removing process has been performed expressed in a RGB color space.

Next, the color image data upon which ground removing has been performed by the image processing device according to the invention will be explained with reference to FIGS. 9A and 9B.

Figure 9A:
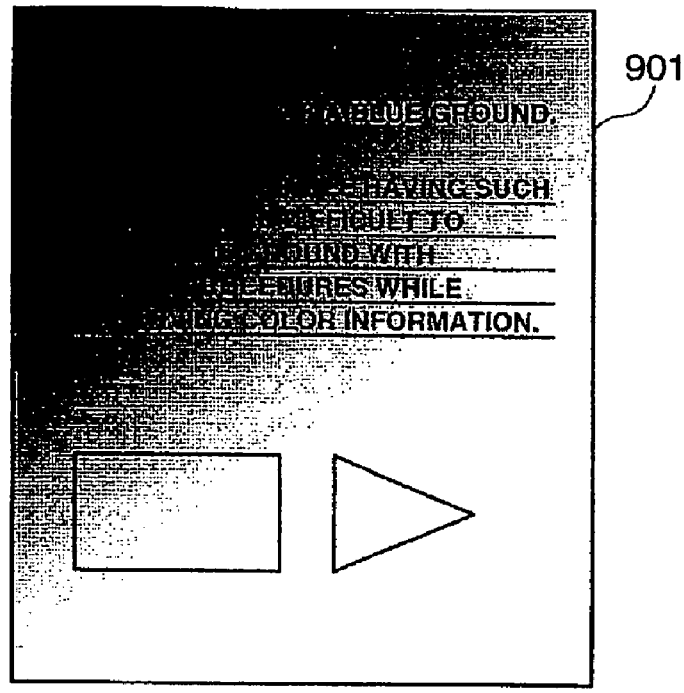
FIGS. 9A and 9B are schematic figures showing color image data before and after being subjected to ground removing process has been performed by the image processing device of the present invention.
Figure 9B:
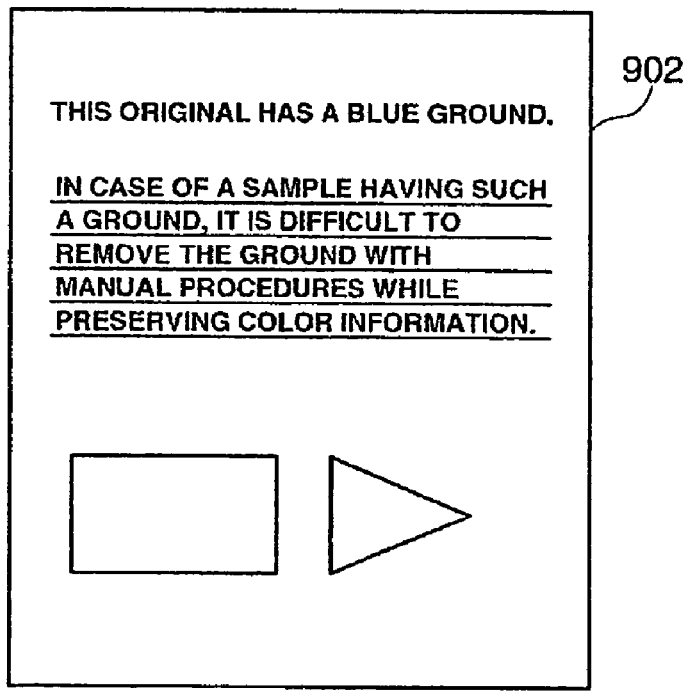

FIGS. 9A and 9B are schematic figures showing color image data before and after ground removing process has been performed by the image processing device of the present invention, FIG. 9A is a schematic figure showing color image data 901 having ground, before ground removing is performed by the image processing device according to the invention; and FIG. 9B is a schematic figure showing the resulting color image data 902, after the color image data 901 of FIG. 9A, in which ground is present, has been subjected to ground removing by the image processing device according to the invention.

When an image is photographed in a location in which the lighting is as not uniform as in the case of a scanner, blotchiness can easily occur within the image, and, as shown in FIG. 9A, the color image data 901 may be in a state of blotchiness with a blue ground, with the characters and lines having a black, red, green, or blue color.

By performing ground removing process with the color image processing device according to the invention, ground such as any unnecessary blotchiness of color is removed from the color image data 901, while preserving the character and line color information, as in the color image data 902 shown in FIG. 9B.

As described above, when performing ground removing process according to the invention, it is possible to input a priority order for the channels which specifies the priority to be applied when performing ground removing, or range values which indicate the ground level which is to be removed; and while, in the related art, when removing the ground from color image data which included characters and/or lines and which had ground, the phenomenon sometimes occurred, when attempting not to remove the color information of these characters or lines, that the ground sometimes undesirably reappeared, so that the boundaries between the ground and the characters or lines became confused and difficult to make out, by contrast, by performing the procedure of ground removing process according to the invention, it becomes possible to adjust the ground in the vicinity of the boundaries between the ground and the characters or lines to a requested ground, and furthermore, by adjustment by the user, it is possible to ensure that the natural color reappears, even while removing the ground.

It should be understood that although, in this embodiment, the explanation was made in terms of the priority order for the channels, which specified the priority when performing ground removing, being the order H-I-S, it would also be possible to apply the present invention as described above, even if the priority order was a different one.

Moreover it may be arranged, with the image processing device according to the invention, to input the color image data which is expressed as a HIS space directly to the memory for processing speed absorption 104, and, after having performed the ground removing process, for color image data to be generated which is expressed as an HIS space, in which the ground has been removed by the color images ground removing unit 102.

By converting color image data which is expressed as some color space other than a RGB space, for example as an L*a*b* space or the like, into a HIS color space in the HIS space conversion unit 105, and by inputting this converted data to the memory for processing speed absorption 104, and by the ground in this color image data which is now expressed as a HIS color space inputted to the memory for processing speed absorption 104 being removed by the color image ground detection unit 101, the color images ground removing unit 102, the user command unit 103, and the memory for processing speed absorption 104, and by then performing conversion, in the image processing device according to the invention comprising a constitutional element in which the color image data expressed as a HIS color space for which ground removing process has been performed is converted into the color image data expressed as an L*a*b* space or the like other than a RGB space, thereby, in summary, such color image data, on which ground removing process has been performed, and which is expressed in some color space other than a RGB space, for example in a L*a*b* space or the like, can be obtained.

Although, in this embodiment, the explanation presumed that the priority order for the channels of the HIS space, which was to become the priority when performing ground removing, was inputted, it would also be possible for the priority order of the channels in the color space of the color image data, for example, in the case of an RGB color space, the channel priority order R-G-B, or, in the case of an L*a*b* space, the channel priority order L*-a*-b*, to be inputted as the channel priority for the color image data when performing ground removing.

It should be understood that although, in this embodiment, the ground level or the ground removing level was obtained for each of the channels H, I, and S, and, for the first channel in the priority order, a range around the threshold value as a center was made to be the subject of ground removing, it would also be acceptable to perform the ground removing process, not for a range around the threshold value which has been obtained as a center, but rather to determine a range below the obtained threshold value as the subject of ground removing.

Moreover, if the color space of the inputted color image data is not RGB but another color space, for example L*a*b* space or the like, by providing, instead of the HIS space conversion unit 105, a HIS space conversion unit which converts the L*a*b* space or the like of the inputted color image data to HIS space, and by providing, instead of the RGB space conversion unit 106, a conversion unit which converts HIS space to the L*a*b* space or the like, it would also be possible to perform ground removing process of color image data which is expressed in L*a*b* space or the like.

Furthermore, even if the color space of the inputted color image data is color image data which is expressed by a color space other than HIS, an image in which ground removing has been performed may be created by detecting the ground level for each of the channels of the color space of the inputted color image data with the ground level detection unit 107 of the color image ground detection unit 101, calculating a ground removing level for each of the channels with the ground removing level calculation unit 108 within the color image ground detection unit 101, and removing the ground for each channel with the color images ground removing unit 102.

It should be understood that although, in the above explanation, the values upon each of the channels H, I, and S into which the color image data was separated by the HIS space conversion unit 105 were assumed to extend from 0 to 255, in order to enhance the accuracy, it would also be acceptable not to use this range from 0 to 255, but rather to extent the range further.

Furthermore, in the case of directly inputting color image data expressed as HIS space into the memory for processing speed absorption 104, it would also be acceptable to provide a data extension unit (not shown in the figures) which, before thus directly inputting this color image data expressed as HIS space directly into the memory for processing speed absorption 104, widens the values of all of H, I, and S to a range of from 0 to 255, or to a further extended range, so that the values of all of H, I, and S are all extended and inputted to the memory for processing speed absorption 104.

It should be understood that the threshold values which are determined by the ground level detection unit 107 in the color image ground detection unit 101 may be offset by adjustment values which are inputted via the user command unit 103, or by values which are determined upon in advance within the ground level detection unit 107.

Moreover, for the range value which specifies the ground level, a method may be employed of directly inputting this range value by the user from the user command unit 103 shown in FIG. 1, and sending it to the ground level detection unit 107 from the user command unit 103; or a method may be employed of, by the color image ground detection unit 101, for a histogram which has been constructed, detecting the bases of a peak in the histogram automatically, and determining this range value as a range from the base of a peak across the summit of the peak to the base on its other side.

With regard to the ground removing level which is calculated by the ground removing level calculation unit 108, it should be understood that, although the ground removing level may be calculated by a method of performing adjustment so that the ground level in the divided area is changed gradually and continuously, or by a method in which it is changed abruptly, it would also be acceptable to arrange for the ground removing level of the channel which is the first one in the priority order inputted via the user command unit 103 to be calculated by the ground level which has been obtained by the ground level detection unit 107, and for the ground removing levels for the other channels to be calculated based upon this ground removing level which has been calculated for the channel which is the first one in the priority order.

Moreover, by incorporating the image processing device according to the invention in a computer or the like, or by installing the structure which is possessed by the image processing device of the present invention as software upon a computer or the like, and by thus arranging for the computer or the like in which the image processing device according to the invention is incorporated, or upon which the structure of the image processing device according to the invention is installed as software, to be endowed with the structure of the image processing device of the present invention, it is possible for an image which has been photographed by a digital camera, or by a portable telephone to which a camera is fitted, to be used for various applications by the computer or the like.

Next, an example will be explained with reference to FIG. 10 in which an image which has been photographed with a portable telephone fitted to a camera, or with a digital camera, is applied to various purposes by a computer or the like having the structure of the image processing device according to the invention.

Figure 10:
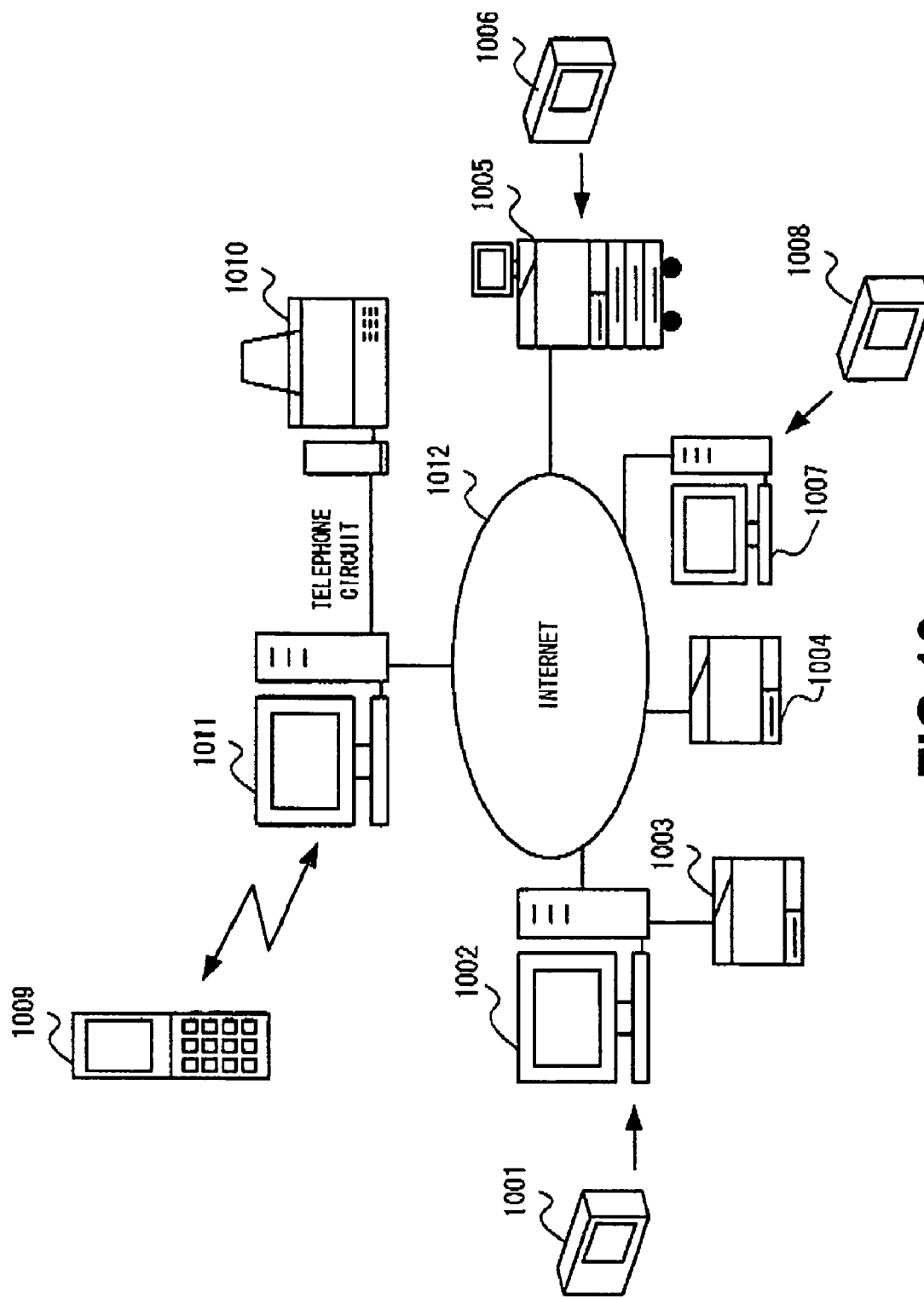
FIG. 10 is a schematic figure showing an example in which an image which has been photographed with, a portable telephone fitted to a camera, or with a digital camera, is applied to various purposes by a computer or the like having the structure of the image processing device according to the present invention.

FIG. 10 is a schematic figure showing an example in which an image which has been photographed with a portable telephone fitted to a camera, or with a digital camera, is applied to various purposes by a computer or the like having the structure of the image processing device according to the invention.

As shown in FIG. 10, a controller 1002 which has the structure of the image processing device according to the invention, a web server 1011 for portable telephones which has the structure of the image processing device of the present invention, an image creation device 1005 which has the structure of the image processing device of the present invention, and a network printer 1004 and a computer 1007, are connected to the internet 1012.

Color image data which has been photographed by the digital camera 1001 is transferred via a multi-purpose interface or medium to the controller 1002, a priority order for the channels H, I, and S and a ground removing standard from strong to weak when performing ground removing upon the controller 1002 are inputted, and a procedure of removing the ground of the color image data is performed for the image which has been transferred to the controller 1002 by the controller 1002, and the color image data in which the ground has thus been removed is stored electronically in the interior of the controller 1002.

This image that has been electronically stored in the controller 1002 may be read out and put to use from a computer not shown in the figure that is connected to a network not shown in the figure to which the controller 1002 is connected, or which is connected to the Internet 1012.

Furthermore, this image that has been processed by the controller 1002 may also be printed out with a printer 1003 that is connected to the controller 1002, after performing a format variable magnification process thereupon.

Yet further, of course, it is possible to cause the image that has been processed by the controller 1002 to be printed out upon a network printer 1004 that is connected to the Internet 1012.

Moreover, it may be supposed that the image creation device 1005 which is connected to the internet 1012 is set up in a shop such as a convenience store or the like, and that it is an image creation device which can print out an image which has been photographed with a digital camera, so that, by the image creation device 1005 being endowed with the function of an image processing device according to the invention, the color image data which has been photographed with the digital camera 1006 may be inputted to this image creation device 1005, a priority order for the channels H, I, and S and a ground removing standard from strong to weak when performing ground removing may be inputted by a user to the image creation device 1005, and processing for removing of ground in the color image data which is inputted may be performed.

As another method of utilizing this image creation device 1005, color image data which has been photographed with a digital camera 1008 may be inputted to a computer 1007 which is connected to the internet 1012, a print reservation upon the image creation device 1005 may be made via the computer 1007, and the aforesaid color image data, a priority order for the channels H, I, and S when performing ground removing which has been inputted upon the computer 1007, and a ground removing standard from strong to weak which has been inputted by the user upon the computer 1007, may be transmitted from the computer 1007 via the internet 1012 to the image creation device 1005. It is also arranged to be possible for the color image data having a ground and for which the print reservation has been made to be subjected to ground removing process by the image creation device 1005, and for the resulting color image data with ground removed to be printed by the image creation device 1005 and to be handed over to the user.

Furthermore, it is also possible to arranged for color image data which has been photographed with a portable telephone incorporating a camera 1009 to be transmitted to the web server 1011 using the portable telephone network, for a priority order for the channels H, I, and S when performing ground removing and a ground removing standard from strong to weak to be inputted from the portable telephone incorporating a camera 1009, for the color image data having ground to be subjected to ground removing process by the web server 1011, and for the resulting image upon which ground removing process has been performed to be returned to the portable telephone incorporating a camera 1009.

Yet further, the image upon which ground removing process has been performed by the web server 1011 may also transmitted to a facsimile device 1010 by utilizing a telephone circuit.

It should be understood that it is also possible to arrange, when using the image processing device according to the invention to convert the information which is written upon a manuscript or upon a whiteboard in a conference hall into electronic form, to perform procedures for removing the ground in information written upon a manuscript or a whiteboard in the conference hall which has been photographed with a zoom camera disposed in the ceiling of the conference hall.

Next, such a situation when, using an image processing device according to the invention, the ground in color image data of a manuscript or a whiteboard in a conference hall which has been photographed with a zoom camera disposed in the ceiling of the conference hall is being removed, and when this color image data upon the manuscript or the whiteboard in a conference hall in which the ground has been removed is being utilized, will be explained with reference to FIG. 11.

Figure 11:
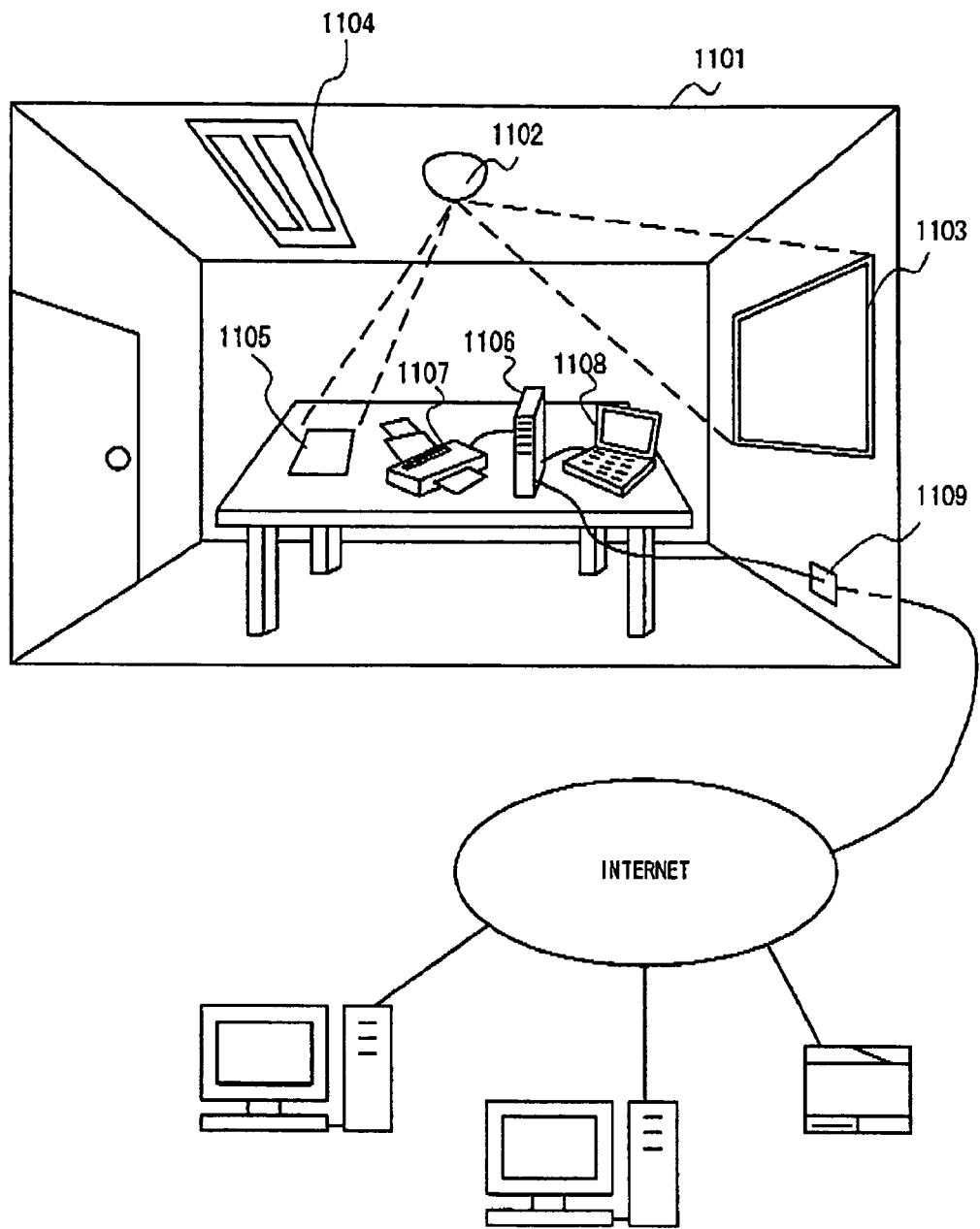
FIG. 11 is a schematic figure showing a situation in which the ground of color image data of a manuscript or a whiteboard which has been photographed in a conference hall with a zoom camera disposed in the ceiling of the conference hall is removed by using the image processing device according to the present invention, and this color image data of the manuscript or whiteboard in the conference hall is being used.

FIG. 11 is a schematic figure showing a situation in which the ground of color image data of a manuscript or a whiteboard which has been photographed in a conference hall with a zoom camera disposed in the ceiling of the conference hall is removed by using the image processing device according to the invention, and this color image data of the manuscript or whiteboard in the conference hall is being used.

As shown in FIG. 11, a zoom camera 1102 and illumination equipment 1104 which constitutes a light source for the conference hall 1101 are provided in a ceiling portion of the conference hall 1101; a whiteboard 1103 is hung upon the wall of the conference hall 1101, and, upon a desk in the conference hall 1101, there are present an image processing device 1106 to which the present invention has been applied, a manuscript 1105 which is being used for a conference, a personal computer 1108, and a printer 1107, while a LAN connector 1109 is present upon the wall of the conference hall 1101.

The zoom camera 1102 is capable of photographing the entire interior of the conference hall 1101, which is illuminated by the illumination equipment 1104.

The whiteboard 1103 is not an electronic board but a normal whiteboard; and any desired letters and symbols may be written by the user thereupon and may be photographed with the zoom camera 1102, and then the color image data that have been photographed may become the subject of ground removing process by the image processing device 1106.

The illumination equipment 1104 constitutes a light source which illuminates the photographic subject photographed by the zoom camera 1102, but, since it is difficult for it to provide uniform lighting upon the photographic subject as is the case in a scanner device, blotchiness of density due to light and shade always appears when the manuscript 1105 or the whiteboard 1013 is photographed with the zoom camera 1102, which is undesirable.

The manuscript 1105 is a manuscript which is used in the conference in which letters and symbols and the like are written upon paper, and it is photographed by the zoom camera 1102, with the color image data which has thus been photographed being processed by the image processing device 1106.

The image processing device 1106 has the structure of the image processing device of the present invention, and it is endowed with the function of performing ground removing process upon color image data having a ground that is inputted thereto.

The printer 1107 prints out the color image data that has been processed by the image processing device 1106.

According to requirements, when removing the ground of color image data of the manuscript 1105 or the whiteboard 1103 which has been photographed with the zoom camera 1102, a priority order for the channels H, I, and S for performing ground removing and a ground removing standard from strong to weak are inputted upon the personal computer 1108.

Furthermore, it is possible to designate a photographic range for photography by the zoom camera 1102 with the personal computer 1108, and it is also possible, from the point of view of security, to designate a place or places which are not to be photographed by the zoom camera 1102.

And the image processing device 1106 may be connected via the LAN connector 1109 in the conference hall 1101 to the internet, so that, when an electronic conference is being held by employing the internet, it becomes possible to transmit the color image data of the whiteboard 1103 or the manuscript 1105 upon which ground removing process has been performed by the image processing device 1106 to another conference hall.

In a conference hall 1101 such as the one shown in FIG. 11, color image data which is photographed while being illuminated with the illumination equipment 1104 which does not provide a uniform illumination effect comes to have a ground, but nevertheless, by using the image processing device 1106 of the present invention for processing the color image data of the manuscript 1105 or the whiteboard 1103 which is photographed with the zoom camera 1102, it becomes possible to perform natural ground removing process thereupon, and thus to put it to good use as electronic data.

As stated above, a first aspect of the present invention is an image processing device which includes: an image data inputting unit that inputs image data; a converting unit that converts image data inputted by the image data inputting unit into data of channels in a predetermined color space; a ground detecting unit that detects respective ground levels from the data of each of the channels converted by the converting unit; a calculating unit that calculates a ground removing level for each of the channel, based on the ground level of each of the channels detected by the ground detecting unit; a ground removing unit that performs a ground removing process for each of the channels, based on the ground removing level of each of the channels calculated by the calculating unit; and a creating unit that creates image data in which the ground is removed, based on the data for each of the channels for which the ground removing process is performed by the ground removing unit.

A second aspect of the present invention is the image processing device, according to the first aspect of the present invention, which may include an area dividing unit that divides the image data inputted by the image data inputting unit into a plurality of areas, in which the detection of the ground level by the ground detecting unit, the calculation of the ground removing level by the calculating unit, and the ground removing process by the ground removing unit, are performed for each of the areas divided by the area dividing unit.

A third aspect of the present invention is the image processing device, according to the first and second aspects of the present invention, which may include: a priority order setting unit that sets a priority order for each of the channels in the predetermined color space; a first ground removing process unit that, based on the ground removing level of the channel for which the priority order is set to a first priority by the priority order setting unit, performs the ground removing process for each pixel of the data of the channel; and a second ground removing process unit that, based on the ground removing level of the channel for which the priority order is set to a first priority, performs the ground removing process for each pixel of the data of other channels.

A fourth aspect of the present invention is the image processing device, according to the third aspect of the present invention, in which the channels in the predetermined color space may be an H channel which represents hue, an I channel which represents intensity, and an S channel which represents saturation; the priority order setting unit may set the H channel to a first priority in order, the I channel to a second priority in order, and the S channel to a third priority in order; the first ground removing process unit, if the level of each pixel of the data of the H channel is within a predetermined range, may set the pixel as a subject for the ground removal; and the second ground removing process unit, if the pixel of the H channel is set as the subject for the ground removal, and the level of the pixel of the I channel is lower than the ground removing level for the channel, may perform the ground removing process by setting the pixel of the I channel as the subject for the ground removal.

A fifth aspect of the present invention is the image processing device, according to the fourth aspect of the present invention, in which the second ground removing process unit, if the pixel of the I channel is set as the subject for the ground removal, may perform the ground removing process for the pixel by setting the level of the pixel of the I channel and of the S channel to a minimum value, and if the pixel of the I channel is not set as the subject for the ground removal, may perform the ground removing process for the pixel by, along with lowering the level of the pixel of the I channel according to the ground level of the I channel, also lowering the level of the pixel of the S channel in correspondence to an amount of dropping of the level of the pixel of the I channel.

A sixth aspect of the present invention is an image processing method which includes: inputting image data by an image data inputting unit; converting, by a converting unit, the image data inputted by the image data inputting unit into data of channels in a predetermined color space; detecting, by a ground detecting unit, respective ground levels from the data of the channels converted by the converting unit; calculating, by a calculation unit, a ground removing level for each of the channels, based on the ground levels of the channels detected by the ground detecting unit; performing, by a ground removing unit, a ground removing process for each of the channels, based on the ground removing level of each of the channels calculated by the calculating unit; and creating, by a creating unit, image data in which a ground is removed, based on the data of each of the channels for which the ground removing process is performed by the ground removing unit.

Since, according to the image processing device and method of the above-mentioned aspects of the present invention, there is provided a structure which includes an image data inputting unit that inputs image data, a converting unit that converts image data inputted by the image data inputting unit to data of several channels in a predetermined color space, a ground detecting unit that detects respective ground levels from the data of the channels converted by the conversion unit, a calculating unit that calculates a ground removing level for each channel, based upon the ground levels of the channels detected by the ground detection unit, a ground removing unit that performs ground removing process upon each of the channels, based upon the ground removing levels for the channels calculated by the calculating unit, and a creating unit that creates image data in which ground has been removed, based upon the data for each channel upon which ground removing process has been performed by the ground removing unit, accordingly the beneficial effect is obtained that it is possible to detect image information which indicates the ground of the color image data, and to remove this ground in an effective manner.

The present invention may be utilized in an image processing device that performs ground removing process upon image data.

According to the invention, it is possible to detect the ground level of the color image data for each channel of the color space, and to remove its ground.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-194920 filed on Jul. 4, 2005, including specification, claims, drawings and abstract, is incorporated herein by reference in its entirety.

What is claimed is:

1. An image processing device comprising:
   an image data inputting unit that inputs image data;
   a converting unit that converts image data inputted by the image data inputting unit into data of channels in a predetermined color space;
   a ground detecting unit that detects respective ground levels from the data of each of the channels converted by the converting unit;
   a calculating unit that calculates a ground removing level for each of the channel, based on the ground level of each of the channels detected by the ground detecting unit;
   a ground removing unit that performs a ground removing process for each of the channels, based on the ground removing level of each of the channels calculated by the calculating unit; and
   a creating unit that creates image data in which the ground is removed, based on the data for each of the channels for which the ground removing process is performed by the ground removing unit.

2. The image processing device according to claim 1, further comprising an area dividing unit that divides the image data inputted by the image data inputting unit into a plurality of areas, wherein
   the detection of the ground level by the ground detecting unit, the calculation of the ground removing level by the calculating unit, and the ground removing process by the ground removing unit, are performed for each of the areas divided by the area dividing unit.

3. The image processing device according to claim 1, wherein the ground removing unit comprises:
   a priority order setting unit that sets a priority order for each of the channels in the predetermined color space;
   a first ground removing process unit that, based on the ground removing level of the channel for which the priority order is set to a first priority by the priority order setting unit, performs the ground removing process for each pixel of the data of the channel; and
   a second ground removing process unit that, based on the ground removing level of the channel for which the priority order is set to a first priority, performs the ground removing process for each pixel of the data of other channels.

4. The image processing device according to claim 3, wherein
   the channels in the predetermined color space are an H channel which represents hue, an I channel which represents intensity, and an S channel which represents saturation, and
   the priority order setting unit sets the H channel to a first priority in order, the I channel to a second priority in order, and the S channel to a third priority in order;
   the first ground removing process unit, if the level of each pixel of the data of the H channel is within a predetermined range, sets the pixel as a subject for the ground removal; and
   the second ground removing process unit, if the pixel of the H channel is set as the subject for the ground removal, and the level of the pixel of the I channel is lower than the ground removing level for the channel, performs the ground removing process by setting the pixel of the I channel as the subject for the ground removal.

5. The image processing device according to claim 4, wherein the second ground removing process unit, if the pixel of the I channel is set as the subject for the ground removal, performs the ground removing process for the pixel by setting the level of the pixel of the I channel and of the S channel to a minimum value, and if the pixel of the I channel is not set as the subject for the ground removal, performs the ground removing process for the pixel by, along with lowering the level of the pixel of the I channel according to the ground level of the I channel, also lowering the level of the pixel of the S channel in correspondence to an amount of dropping of the level of the pixel of the I channel.

6. An image processing method, comprising:
   inputting image data by an image data inputting unit;
   converting, by a converting unit, the image data inputted by the image data inputting unit into data of each channel in a predetermined color space;
   detecting, by a ground detecting unit, respective ground levels from the data of each channel converted by the converting unit;
   calculating, by a calculation unit, a ground removing level for each of the channels, based on the ground levels of each of the channels detected by the ground detecting unit;
   performing, by a ground removing unit, a ground removing process for each of the channels, based on the ground removing level of the channels calculated by the calculating unit; and
   creating, by a creating unit, image data in which a ground is removed, based on the data of each of the channels for which the ground removing process is performed by the ground removing unit.

* * * * *